US010027963B2

(12) United States Patent
Su et al.

(10) Patent No.: US 10,027,963 B2
(45) Date of Patent: Jul. 17, 2018

(54) PRE-DITHERING IN HIGH DYNAMIC RANGE VIDEO CODING

(71) Applicant: Dolby Laboratories Licensing Corporation, San Francisco, CA (US)

(72) Inventors: Guan-Ming Su, Fremont, CA (US); Qian Chen, San Jose, CA (US); Bongsun Lee, Cupertino, CA (US); Scott Daly, San Francisco, CA (US)

(73) Assignee: Dolby Laboratories Licensing Corporation, San Francsico, CA (US)

( * ) Notice: Subject to any disclaimer, the term of this patent is extended or adjusted under 35 U.S.C. 154(b) by 247 days.

(21) Appl. No.: 15/035,551

(22) PCT Filed: Nov. 10, 2014

(86) PCT No.: PCT/US2014/064845
§ 371 (c)(1),
(2) Date: May 10, 2016

(87) PCT Pub. No.: WO2015/073373
PCT Pub. Date: May 21, 2015

(65) Prior Publication Data
US 2016/0301934 A1 Oct. 13, 2016

Related U.S. Application Data

(60) Provisional application No. 61/903,189, filed on Nov. 12, 2013.

(51) Int. Cl.
*H04N 19/146* (2014.01)
*H04N 19/117* (2014.01)
(Continued)

(52) U.S. Cl.
CPC ......... *H04N 19/146* (2014.11); *H04N 19/117* (2014.11); *H04N 19/124* (2014.11); *H04N 19/30* (2014.11)

(58) Field of Classification Search
CPC .. H04N 19/146; H04N 19/117; H04N 19/124; H04N 19/30
See application file for complete search history.

(56) References Cited

U.S. PATENT DOCUMENTS

| 6,204,881 B1 * | 3/2001 | Ikeda ....................... H04N 5/20 348/229.1 |
| 7,339,632 B2 | 3/2008 | Weitbruch |

(Continued)

FOREIGN PATENT DOCUMENTS

| CN | 101371583 | 2/2009 |
| CN | 103262535 | 8/2013 |

(Continued)

OTHER PUBLICATIONS

Daly, S. et al "Decontouring: Prevention and Removal of False Contour Artifacts" Proc of SPIE—The International Society for Optical Engineering, vol. 5292, p. 130-149, Jan. 2004.

(Continued)

*Primary Examiner* — Behrooz Senfi (57) ABSTRACT

An encoder receives an input enhanced dynamic range (EDR) image and a corresponding lower dynamic range (LDR) image to be coded at a given target rate. Before coding, a pre-dithering process is applied to the input LDR image to generate a dithered LDR image at a second bit depth, lower than its original bit depth. The pre-dithering process includes: generating uniformly-distributed noise, applying a spatial filter to the noise to generate low-pass or high-pass filtered noise, applying a temporal high pass or low pass filter to the spatially-filtered noise to generate output noise, adding the output noise to the input LDR image to generate a noise-enhanced LDR image, and quantizing the noise-enhanced image to generate the dithered LDR image. Selecting the characteristics of the dithering (Continued)

filters is based on both the target bit rate and luminance characteristics of the pixels in the input LDR image.

18 Claims, 5 Drawing Sheets

(51) Int. Cl.
*H04N 19/30* (2014.01)
*H04N 19/124* (2014.01)

(56) References Cited

U.S. PATENT DOCUMENTS

| | | | |
|---|---|---|---|
| 7,450,181 B2 * | 11/2008 | Daly | G06T 5/001 |
| | | | 348/607 |
| 8,537,904 B2 | 9/2013 | Babonneau | |
| 9,264,681 B2 | 2/2016 | Gish | |
| 2003/0164961 A1 * | 9/2003 | Daly | G06T 5/001 |
| | | | 358/1.9 |
| 2009/0180555 A1 | 7/2009 | Sun | |
| 2011/0075729 A1 | 3/2011 | Dane | |
| 2011/0188744 A1 * | 8/2011 | Sun | G06T 5/50 |
| | | | 382/162 |
| 2011/0194618 A1 | 8/2011 | Gish | |
| 2012/0206657 A1 | 8/2012 | Bratt | |
| 2012/0307898 A1 | 12/2012 | Chono | |
| 2013/0004074 A1 | 1/2013 | Gish | |
| 2013/0114690 A1 | 5/2013 | Chono | |
| 2013/0148029 A1 | 6/2013 | Gish | |
| 2013/0148907 A1 | 6/2013 | Su | |
| 2014/0247869 A1 | 9/2014 | Su | |
| 2015/0341675 A1 | 11/2015 | Su | |
| 2016/0005349 A1 | 1/2016 | Atkins | |
| 2016/0080712 A1 | 3/2016 | Daly | |

FOREIGN PATENT DOCUMENTS

| | | |
|---|---|---|
| WO | 94/03988 | 2/1994 |
| WO | 2013/039730 | 3/2013 |
| WO | 2013/059116 | 4/2013 |
| WO | 2013/067113 | 5/2013 |

OTHER PUBLICATIONS

Mai, Z. et al "Optimizing a Tone Curve for Backward-Compatible High Dynamic Range Image and Video Compression" IEEE Transactions on Image Processing, vol. 20, No. 6, Jun. 1, 2011, pp. 1558-1571.

Yu, Shiang-Hwua "Feedback Dithering for Decorrelating Quantization Noise and Enhancing SNDR" IEEE Transactions on Control Systems Technology, vol. 20, No. 3, May 2012, pp. 621-631.

Ashourian, M. et al "Visual Quality Improvement of Image Sub-band Coder with Dithering" IEEE Region 10 Annual Conference, New York, NY vol. 2, Oct. 28, 2002, pp. 869-872.

Banterle, F. et al "High Dynamic Range Imaging and Low Dynamic Range Expansion for Generating HDR Content" Computer Graphics Forum, vol. 28, No. 8, pp. 2343-2367, 2009.

Mantiuk, R. et al "Backward Compatible High Dynamic Range MPEG Video Compression" Proc. of ACM Siggraph, vol. 25, Issue 3, Jul. 2006, pp. 713-723.

Delley, Robin J. et al "A Simple Parametric Model of the Human Ocular Modulation Transfer Function" Opthalmic and Physiological Optics, 1991, 91-93.

* cited by examiner

PRE-DITHERING IN HIGH DYNAMIC RANGE VIDEO CODING

CROSS-REFERENCE TO RELATED APPLICATIONS

This application claims the benefit of priority from U.S. Provisional Patent Application Ser. No. 61/903,189, filed on Nov. 12, 2013, which is hereby incorporated by reference in its entirety.

TECHNOLOGY

The present invention relates generally to video images. More particularly, an embodiment of the present invention relates to the upstream dithering or pre-dithering of video signals before being encoded.

BACKGROUND

As used herein, the term 'dynamic range' (DR) may relate to a capability of the human psychovisual system (HVS) to perceive a range of intensity (e.g., luminance, luma) in an image, e.g., from darkest darks (blacks) to brightest brights (whites). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). For example, well adapted humans with essentially normal vision (e.g., in one or more of a statistical, biometric or ophthalmological sense) have an intensity range that spans about 15 orders of magnitude. Adapted humans may perceive dim light sources of as few as a mere handful of photons. Yet, these same humans may perceive the near painfully brilliant intensity of the noonday sun in desert, sea or snow (or even glance into the sun, however briefly to prevent damage). This span though is available to 'adapted' humans, e.g., those whose HVS has a time period in which to reset and adjust.

In contrast, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable by short-term adaptation though a HVS. As used herein, EDR may relate to a DR that spans 5 to 6 orders of magnitude. Thus while perhaps somewhat narrower in relation to true scene referred HDR, EDR nonetheless represents a wide DR breadth.

In practice, images comprise one or more color components (e.g., luma Y and chroma Cb and Cr) wherein each color component is represented by a precision of n-bits per pixel (e.g., n=8). Using linear luminance coding, images where $n \leq 8$ (e.g., color 24-bit JPEG images) are considered images of standard dynamic range, while images where $n > 8$ may be considered images of enhanced dynamic range. EDR and HDR images may also be stored and distributed using low bit-depth, non-linear luminance coding (e.g., 10-bits and logarithmic luminance coding), or high-precision (e.g., 16-bit) floating-point formats, such as the OpenEXR file format developed by Industrial Light and Magic.

Most consumer desktop displays support luminance of 200 to 300 $cd/m^2$ or nits. Most consumer HDTVs range from 300 to 1000 $cd/m^2$. Such conventional displays thus typify a low dynamic range (LDR), also referred to as a standard dynamic range (SDR), in relation to HDR or EDR. As the availability of EDR content grows due to advances in both capture equipment (e.g., cameras) and EDR displays (e.g., the PRM-4200 professional reference monitor from Dolby Laboratories), EDR content may be color graded and displayed on EDR displays that support higher dynamic ranges (e.g., from 1,000 nits to 5,000 nits or more).

To support backwards compatibility with legacy playback devices as well as new HDR or ultra-high definition (UHD) display technologies, multiple bitstream layers may be used to deliver UHD and HDR (or EDR) video data from an upstream device to downstream devices. Given such a multi-layer stream, legacy decoders may use one set of layers to reconstruct an HD version of the content with lower dynamic range (LDR) or standard dynamic range (SDR). Advanced decoders may use a second set of layers to reconstruct an HD or UHD EDR version of the content to render it on more capable displays. An example of such system was described in U.S. Provisional Patent Application Ser. No. 61/882,773, filed on Sep. 26, 2013, titled "Backward-compatible coding for ultra-high definition signals with enhanced dynamic range," which was also filed on Dec. 4, 2013 as PCT Application Ser. No. PCT/US2013/073085, which is incorporated herein by reference in its entirety.

In such systems, the bit-depth of the LDR path is typically only 8-bits, which may result in artifacts, such as banding and false contouring, during the decoding and display process. As used herein, for an image with multiple color components (e.g., RGB or YCbCr), the term n-bit image (e.g., 12-bit or 8-bit image) denotes an image where pixels of its color components are represented by n-bit pixels. For example, in an 8-bit RGB image, each pixel comprises of three color components, each color component (e.g., R, G, or B) may be represented by 8-bits, for a total of 24 bits per color pixel.

Some of these artifacts may be removed in a decoder; however, legacy decoders may not have the processing capabilities or computing power to directly address the problem. As appreciated by the inventors here, improved pre-dithering techniques for the coding and distribution of multi-format EDR video are desirable. In image and video processing, dithering techniques are typically applied downstream, in a decoder, close to the display. As used herein, the terms "pre-dithering" or "upstream dithering" denote dithering techniques applied to a video signal before being encoded to be transmitted downstream.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Methods and systems for pre-dithering as applied to coding EDR and LDR video signals are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to the pre-dithering of video images with high or enhanced dynamic range. A video encoder receives input enhanced dynamic range (EDR) images and a corresponding lower dynamic range (LDR) images to be coded at a given target rate. Before coding, a pre-dithering process is applied to the input LDR images to generate dithered LDR images at a second bit depth, lower than the original bit depth. The pre-dithering process includes: generating uniformly-distributed noise, applying a spatial filter to the noise to generate spatially-filtered noise, applying a temporal filter to the spatially-filtered noise to generate output noise, adding the output noise to the input LDR image to generate a noise-enhanced LDR image, and quantizing the noise-enhanced image to generate the dithered LDR image.

In an embodiment, the spatial filter and the temporal filter are low-pass filters, and the spatial filter is based on the optical transfer function (OTF) of the human visual system (HSV).

In an embodiment, the spatial filter and the temporal filter are high-pass filters, and the spatial filter is based on the optical transfer function (OTF) of the human visual system (HSV).

In an embodiment, selecting whether to apply low-pass or high-pass filters is based on the target bit rate at the output of the video encoder.

In an embodiment, the pass-band of the spatial filters is based on the luminance of the input LDR images.

Coding of Multi-Format EDR Signals
Layered Coding

Existing display and play-back devices, such as HDTVs, set-top boxes, or Blu-ray players, typically support signals of up to 1080p HD resolution (e.g., 1920×1080 pixels at 60 frames per second). For consumer applications, such signals are now typically compressed using a bit-depth of 8 bits per pixel per color component. Because of the 8-bit depth and the corresponding low dynamic range, such signals are typically referred to as signals with standard dynamic range (SDR).

Figure 1A:
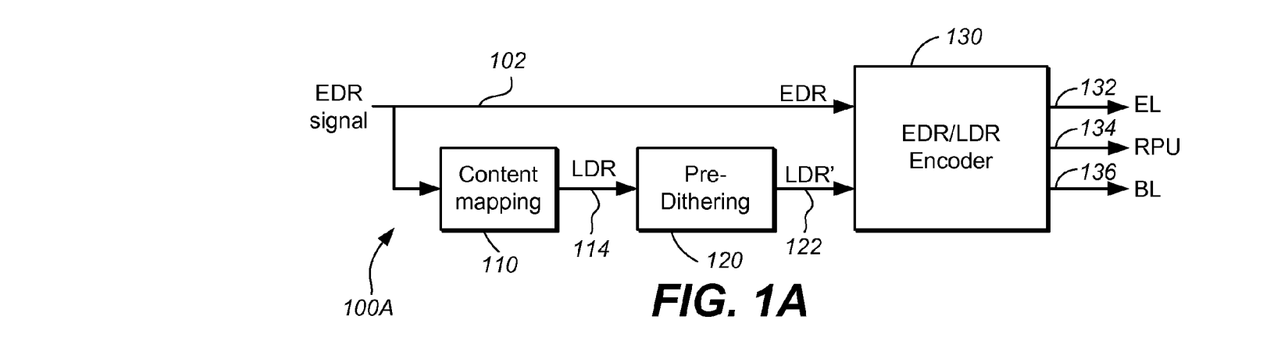
FIG. 1A and FIG. 1B depict example systems for coding EDR and LDR images according to embodiments of the present invention.

As new television standards are being developed, such as Ultra-High Definition (UHD), it may be desirable to encode signals with enhanced resolution and/or enhanced dynamic range while allowing legacy decoders to still be able to receive and decode a version of the same signal with lower dynamic range (e.g., SDR). FIG. 1A depicts an embodiment of an example implementation of a backwards-compatible system supporting coding of signals with enhanced dynamic range (EDR) and lower dynamic range (LDR).

Ignoring for a moment the pre-dithering module (120), as depicted in FIG. 1A, given an EDR input (102), an LDR signal (114) may be generated using a content mapping process (110). As used herein, an "input EDR image or signal" refers to enhanced or high dynamic range image data (e.g., raw image data captured by a high-end image acquisition device and the like) that may be used to derive an EDR version of the input image. Content mapping process (110) may combine a variety of techniques known in the art to map raw or color-graded EDR content to LDR content, such as global or local tone mapping followed by color grading for a target display. Other examples of content mapping processes are described in PCT Application with Ser. No. PCT/US2012/062932 (the '932 application), filed on Nov. 1, 2012, titled "Layer decomposition in hierarchical VDR coding," by G-M. Su et al., and U.S. Provisional Patent Application with Ser. No. 61/810,104, filed on Apr. 9, 2013, titled "Display management for high dynamic range video," by R. Atkins, et al., which was also filed on Feb. 13, 2014 as PCT Application Ser. No. PCT/US2014/016304, both of which are incorporated herein by reference in their entirety.

EDR/LDR encoder (130), as described for example in the U.S. Provisional Patent Application 61/882,773, typically comprises a base layer (BL) Encoder, which generates a coded base layer (BL) stream (136), and an enhancement layer (EL) encoder, which generates a coded EL stream (132). In some embodiments, an auxiliary reference processing unit (RPU) stream (134) may also be generated. The RPU stream typically carries ancillary data (also commonly referred to as metadata) that may assist a decoder to better access parameters needed for a proper decoding process. As defined herein, the term "metadata" or 'ancillary data" may relate to any auxiliary information that is transmitted as part of the coded bit-stream and assists a decoder to render a decoded image. Such metadata may include, but are not limited to, information as: color space or gamut information, dynamic range information, tone mapping information, or other encoder-related operators.

In an embodiment, the coded BL stream (136) may comprise a backwards-compatible coded LDR stream, while the coded EL stream (132) may comprise a residual stream, which can be used by an advanced decoder together with the decoded BL signal to regenerate the EDR signal (102).

Figure 1B:
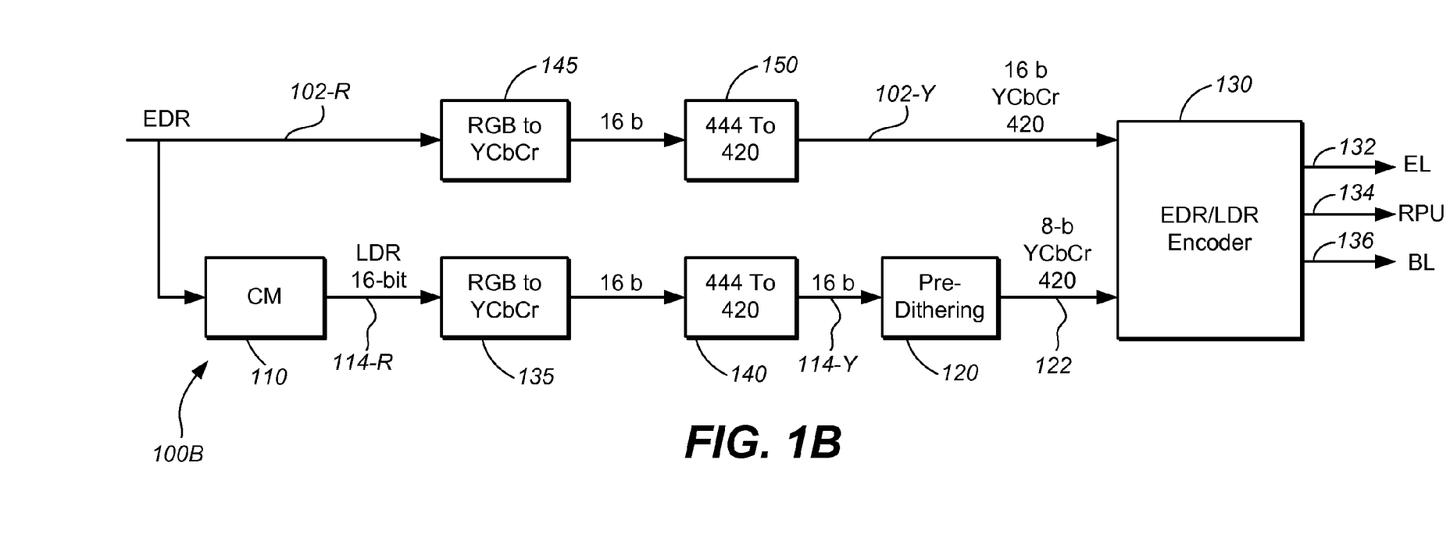

The input EDR image (102) may be in any color space that supports a high dynamic range color gamut. Despite having a lower dynamic range than the input EDR signal (102), LDR signal (114) may be represented at the same bit depth or a lower bit depth than the bit-depth of the EDR signal (102). In an embodiment, the input EDR may be in 16-bit in RGB space and the corresponding LDR signal may be in 16-bit or 12-bit RGB space. As depicted in FIG. 1B, an encoding system (100B) may include additional color-transformation and color sub-sampling units to accommodate bit-depth or color-format constrains in the EDR/LDR Encoder (130).

Each pixel may optionally and/or alternatively comprise up-sampled or down-sampled pixel values for one or more of the channels in the color space. It should be noted that in some embodiments, in addition to three primary colors such as red, green and blue, different primary colors may be concurrently used in a color space as described herein, for example, to support a wide color gamut; in those embodiments, image data as described herein includes additional pixel values for those different primary colors and may be concurrently processed by techniques as described herein.

As depicted in FIG. 1B, in an embodiment, content mapping (110) converts 16-$b$ RGB EDR input (102-R) to 16-$b$ RGB LDR (114-R). Both the EDR signal (102-R) and LDR signal (114-R) are color-transformed and color subsampled to generate corresponding signals (102-Y) and (114-Y) in the YCbCr 4:2:0 color format, the preferred coding compression format in encoder (130). Traditionally, after a simple truncation to 8-bits, LDR signal 114-Y is passed to encoder 130 to be coded and generate BL stream (136); however, as proposed by this invention, by applying a pre-dithering process (120) to the LDR signal (114-Y), false contouring and potentially false color artifacts may be significantly reduced or eliminated.

After generating all parts of the layered EDR stream, the coded EL stream (132), the coded BL stream (136), and related metadata (134) are multiplexed and packetized so that they can be stored in a storage medium and/or be transmitted to a decoder.

Dithering Techniques

In graphics and display-related processing, traditional dithering techniques include the steps of: a) generating a noise or dither pattern b) adding the generated noise to the signal to be displayed, and c) quantizing the output to the desired bit depth. In coding theory, it is rarely recommended to add noise before compressing a signal, since noise increases the entropy of the signal and thus reduces coding efficiency; hence any noise addition in step (120) must also take into account a variety of contradictory goals, such as:

Reduce false contouring and other artifacts at the decoder;

Maintain compression efficiency, especially at low bit rates (e.g., 5.2 Mbits/s for 1080p, 3.75 Mbits/s for 720p); and Preserve the original video quality of the input A1. Dithering Using High-Pass Filtered Noise Given, a sequence of N-bit input images (e.g., N=16 bits) to be quantized down to a P-bit images, where P<N bits, during digital dithering, noise is added to these images before the lower bits are dropped or quantized. The basic engineering trade-off is to add as much noise as possible to enable the preservation of as much effective perceptual bits through the bit depth reduction process and the image compression or coding process, yet have the noise itself be invisible at the decoder. The invisibility depends primarily on display and viewing distance parameters. In an embodiment, the noise characteristics of the noise source used in image dithering are determined based on a model of the optical transfer function (OTF) of the human visual system (HVS) and target bit rate requirements at the output of the EDR/LDR Encoder (130).

The OTF of the HVS, from now on to be denoted simply as OTF, is a strictly low-pass function, and is thus a better representative to an averaging process than the contrast sensitivity function (CSF) of the HVS. A common OTF representation is described in Deeley, Robin J., Neville Drasdo, and W. Neil Charman, in "A simple parametric model of the human ocular modulation transfer function," *Ophthalmic and Physiological Optics* 11.1 (1991): 91-93, which is incorporated herein by reference in its entirety.

Figure 2A:
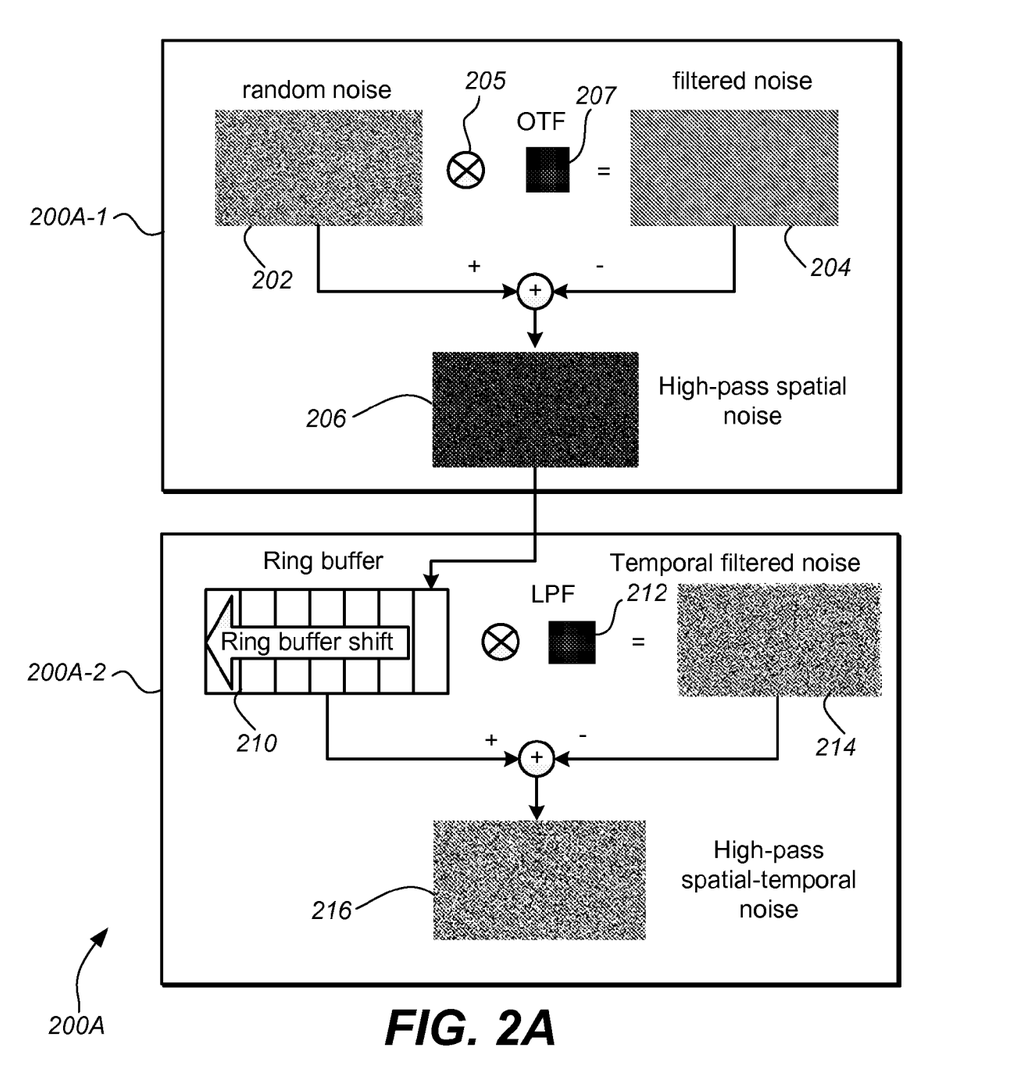
FIG. 2A and FIG. 2B depict example data flows for generating dithering noise for coding EDR images according to embodiments of the present invention.

FIG. 2A depicts an example method (200A) to generate high-pass dithering noise according to an embodiment of the present invention. The method may be applied separately to one or more of the color components of the input LDR image. The noise is generated in two steps: a) spatially filtering uniform random noise to generate high-pass noise (200A-1) and b) applying temporal filtering to the generated high-pass noise to generate high-pass spatial-temporal noise (200A-2).

Step 1: Spatial Filtering

Let $\tilde{N}_f$ denote a W (width)×H (height) (in pixels) image generated from a uniform random noise source having values between 0 and 1. Let each pixel element (x, y) of $\tilde{N}_f$ be denoted as $\tilde{n}_f(x, y)$, where $\tilde{n}_f(x, y) \in [0,1]$.

Denote the original EDR signal bit depth as $B_{EDR}$ and denote the base layer bit depth as $B_{BL}$. The number of code words to be removed from a $B_{EDR}$ bits representation to a $B_{BL}$ bits representation is denoted as $C=2^{B_{EDR}-B_{BL}}$. In an embodiment, a scaled random image $N_f$ (e.g., 202) can be obtained by multiplying $\tilde{N}_f$ with C or a function of C, e.g.:

$$N_f = C \cdot \tilde{N}_f$$

For example, for $B_{EDR}$=16 and $B_{BL}$=8, $C=2^8=256$. As depicted in FIG. 2A, scaled random image $N_f$ (202) may be filtered (205) by a 2D low-pass filter Fs representing Deeley's OTF model. Let $$D_f^L = N_f \otimes F_S,$$

and $$D_f^H = N_f - (N_f \otimes F_S),$$

denote a low-pass filtered noise signal (204) and a high-pass filtered noise signal (206), where the symbol ⊗ (205) denotes a convolution. Denote the pixel element in $D_f^L$ (204) and $D_f^H$ (206) as $d_f^L(x, y)$ and $d_f^H(x, y)$.

Step 2: Temporal Filtering (200A-2)

Consider a ring buffer (210) (e.g., a buffer with separate start and end pointers) holding up to P high-pass noise pictures (206), denoted as $D_0^H, D_1^H, \ldots, D_{P-1}^H$. As time progresses, the oldest picture in the buffer (e.g., $D_{P-1}^H$) is replaced by a new noise picture generated in Step 1.

Consider now a low pass filter (LPF) filter $F_T$ (212) to filter co-located pixels of images stored in the ring buffer (210). Denote the filter coefficients of LPF (212) as $F_T(0), F_T(1), \ldots, F_T(P-1)$. Denote the output temporal filtered image (214) as $T^L$ with elements in $T^L$ denoted as $t^L(x, y)$. Then a high-pass noise image (216) with elements $t^H(x, y)$ is obtained by first applying the low-pass filter (212) and then subtracting its output from the corresponding pixel in the (P−1)/2 dithering picture, $$d_{\left(\frac{P-1}{2}\right)}^H(x, y):$$

$$t^L(x, y) = \sum_{f=0}^{P-1} F_T(f) d_f^H(x, y), \text{ (low-pass signal)}$$

$$t^H(x, y) = \left[ d_{\left(\frac{P-1}{2}\right)}^H(x, y) - t^L(x, y) \right] k, \text{ (high-pass signal)}$$

where k is an optional scaling factor. In an embodiment k may vary depending on the color component for which the dithering noise is generated (e.g., k=4 for Y, k=3 for Cb and k=2 for Cr). This process is repeated for all W×H pixels to generate output noise image (216) to be used in the dithering process.

As new noise images (206) are generated, the ring buffer (210) may be updated as follows. Once a new high-pass spatial-temporal dithering picture (216) is generated, the pictures in the ring buffer may shift by one position. Then the most recently generated from step 1 dithering picture is inserted at one of the end-buffer positions, e.g., the P−1-th image slot (assuming buffer locations are numbered starting with 0). For example, for a ring buffer using left shifts, the ring buffer operations may be expressed as:

(a) $D_f^H = D_{f+1}^H$ for f=0, 1, . . . , P−2
(b) $D_{P-1}^H$ =new $D_f^H$ (206) from Step 1.

Step 3: Perform Pre-Dithering

Given LDR input I(x, y) (114), the dithering pattern $t^H(x, y)$ is multiplied by a scaling factor s(x, y) and then is added to the LDR input $$I_N(x,y) = I(x,y) + s(x,y) \cdot t^H(x,y). \quad (1)$$

The scaling factor can be global, i.e. identical for the entire picture (e.g. s(x, y)=8 for all values of x and y, and for all color components of the LDR image), or it can be adaptively adjusted according to local content characteristics. Finally, the quantized LDR' signal (122) may be generated as $$I_{BL}(x,y) = I_N(x,y) >> (B_{EDR} - B_{BL}), \quad (2)$$

where a>>n denotes shifting a to the right by n bits (or dividing a by $2^n$).

In some embodiments, OTF (207) and LPF (212) filters may utilize already normalized filter coefficients (i.e., the sum of all the filter coefficients adds to one), in that case, the normalization step may be skipped.

A2. Dithering Using Low-Pass Filtered Noise

Experimental results demonstrated that adding high-frequency dithering noise provides satisfactory results at medium to high bitrates; however, at low bit rates, due to high quantization, other coding artifacts may appear. Hence it may be beneficial to add low-frequency dithering noise, as depicted in FIG. 2B.

Figure 2B:
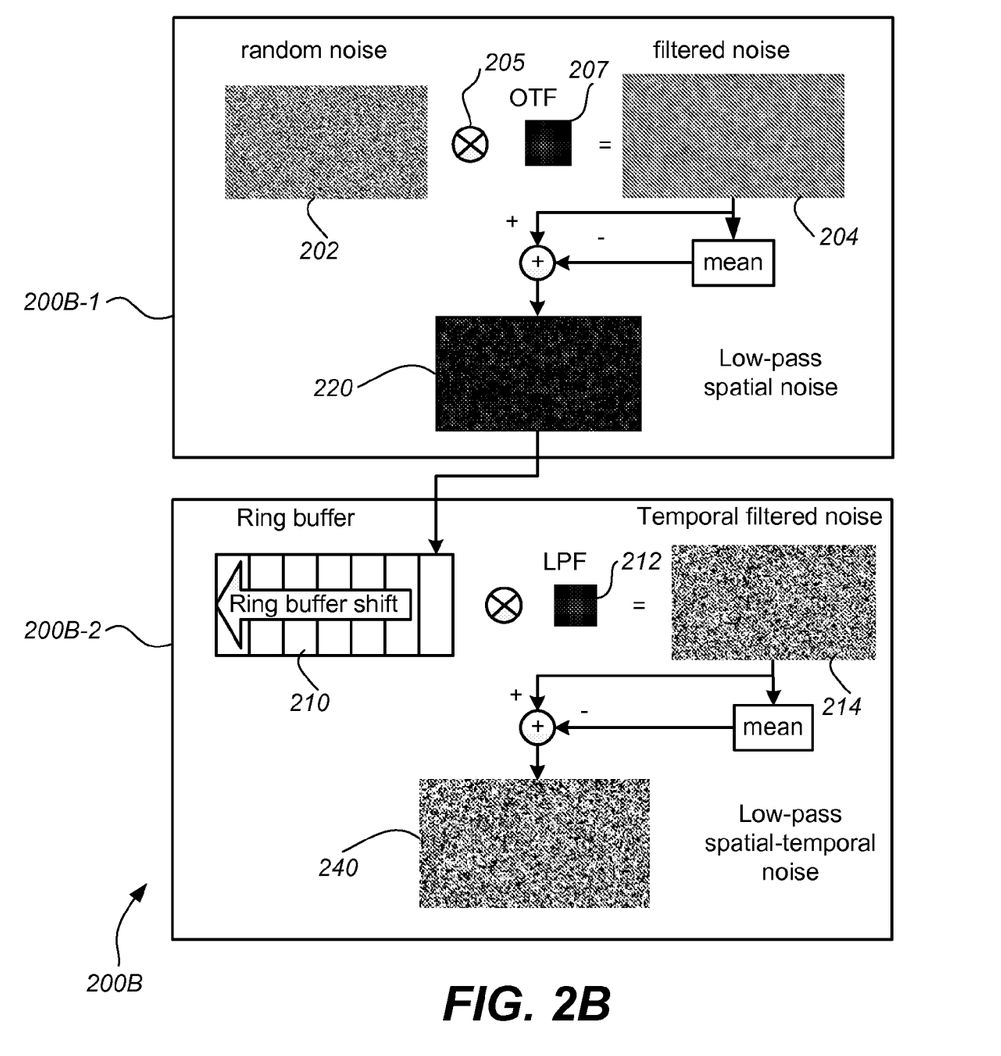

The processing flow in FIG. 2B is very similar to the flow in FIG. 2A, except that a) in Step 1 (200B-1), only the low-pass filtered noise (204) is retained, and Step 2 (200B-2) applies a low-pass temporal filter instead of a high-pass temporal filter.

Using the same notation as before, given a uniform noise source $N_f$ (202) and an OTF-based low-pass filter (207) with filter coefficients $F_s$, in Step 1 (200B-1) of this process (200B), generated filtered noise (204) may be expressed as $$D_f^L = N_f \otimes F_s.$$

Let a $\hat{d}_f^L(x, y)$ denote the elements in $D_f^L$ (204), and let $$\overline{d}_f^L = \frac{1}{WH} \sum_{x=0}^{W-1} \sum_{y=0}^{H-1} \hat{d}_f^L(x, y)$$

denote its average, then low-pass filtered spatial noise (220) is computed as $$D_f^L = \hat{D}_f^L - \overline{d}_f^L,$$

where $d_f^L(x, y) = \hat{d}_f^L(x, y) - \overline{d}_f^L$.

As in process (200A), noise images generated in the first stage are copied into the ring buffer (210) for temporal filtering using a temporal low-pass filter (212). Let the output of the temporal filter (212) be denoted as $$\hat{t}^L(x, y) = \sum_{f=0}^{P-1} F_T(f) d_f^L(x, y),$$

with a mean value denoted as $$\overline{t}^L = \frac{1}{WH} \sum_{x=0}^{W-1} \sum_{y=0}^{H-1} \hat{t}^L(x, y).$$

Then, the pixel elements of final low-pass filtered dithering noise $T^L$ (240) may be expressed as $$t^L(x,y) = \hat{t}^L(x,y) - \overline{t}^L.$$

Given $T^L$ (240), the rest of the dithering process is similar as before, that is, given LDR input I(x, y) (114), the dithering pattern $t^L(x, y)$ is multiplied by a scaling factor s(x, y) and then added to the LDR input $$I_N(x,y) = I(x,y) + s(x,y) \cdot t^L(x,y) \quad (3)$$

The scaling factor can be global, i.e. identical for the entire picture, or it can be adaptively adjusted according to local content characteristics. Finally, the quantized LDR signal (122) may be generated as $$I_{BL}(x,y) = I_N(x,y) >> (B_{EDR} - B_{BL}). \quad (4)$$

Figure 3:
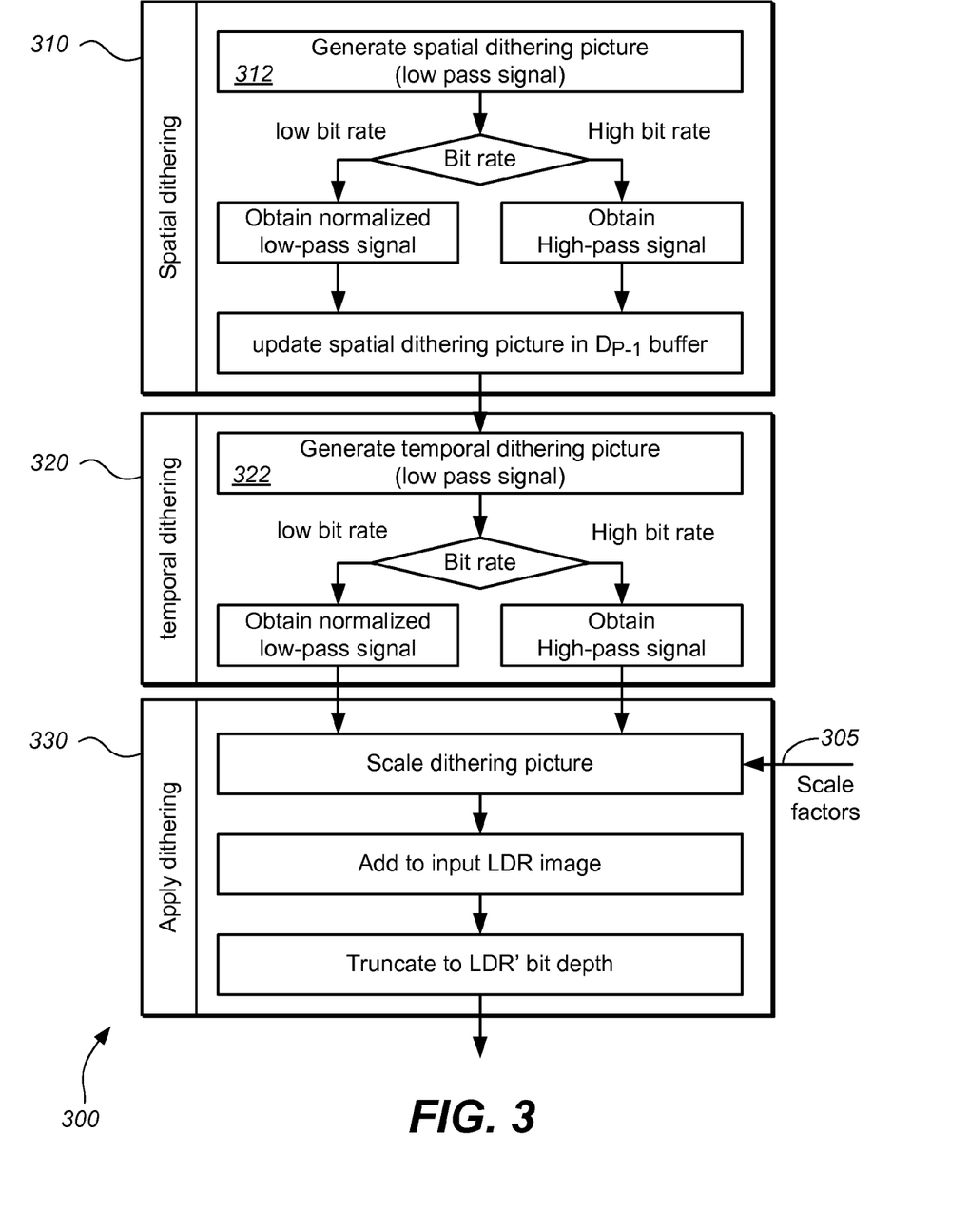
FIG. 3 depicts an example for pre-dithering of EDR images according to an embodiment of the present invention.

In an embodiment, the low-pass (200B) and high-pass (200A) filtered noise processes may be combined. An example of such a combined process is depicted in FIG. 3. For each input LDR frame, in step (312), an OTF-filtered image (e.g., image (204)) is generated. Then, depending on the target bit rate at the output of EDR/LDR Encoder (130), either a normalized low-pass filtered noise image (220) or a high-pass filtered noise image (206) is generated and the $D_{P-1}$ location of the ring buffer (210) is updated.

In step (322), a low-pass temporal filter is applied to the images in the ring buffer (210) to generate a temporally-filtered low-pass noise image (214). Then, depending on the bit rate, either a normalized low-pass image (240) or a high-pass filtered noise image (216) is generated to be added to the source LDR image. Finally, in step (330), the noise image is scaled by scale factors (305) and added to the source LDR image (see equations (1) or (3)). The final, bit-truncated, LDR' image (122) is generated (see equations (2) and (4)) and passed to encoder (130) for further processing.

A3. Adaptive OTF Pass-Band Selection

In equations (1) and (3), scale factors s(x, y) may be used to adjust the strength of the applied noise; however, these scale factors have no effect on the "smoothness" of the noise, which in effect controls how the additive noise may effect potential false contours or other artifacts. One way to control the smoothness of the noise is by adjusting the pass-band of the OTF filter, which in an embodiment it is determined by the kernel size of the OTF filer (207). For example, a 7×7 OTF filter may have a far broader pass band than a 57×57 OTF filter. Hence, in some embodiments, it may advantageous to adjust the pass-band of the OTF filter depending on the local brightness of LDR input (114).

Consider for example, Stage 1 (200B-1) of process (200B) as depicted in FIG. 2B. Instead of using a single OTF filter $F_s$, in an example embodiment, consider applying two different OTF filters, $F_s^W$ and $F_s^N$, where $F_s^W$ has a wider pass-band than $F_s^N$. As described in Section A2, given noise image $N_f$, two different low-pass filtered noise signals may be generated for each of the OTF filters:

$$\hat{D}_f^{L,W} = N_f \otimes F_s^W,$$

and $$\hat{D}_f^{L,N} = N_f \otimes F_s^N.$$

If needed, their means $$\overline{d}_f^{L,W} = \frac{1}{WH} \sum_{x=0}^{W-1} \sum_{y=0}^{H-1} \hat{d}_f^{L,W}(x,y),$$

and $$\overline{d}_f^{L,N} = \frac{1}{WH} \sum_{x=0}^{W-1} \sum_{y=0}^{H-1} \hat{d}_f^{L,N}(x,y),$$

may be computed to generate normalized low-pass filtered signals $$D_f^{L,W} = \hat{D}_f^{L,W} - \overline{d}_f^{L,W},$$

and $$D_f^{L,N} = \hat{D}_f^{L,N} - \overline{d}_f^{L,N}.$$

Denote as $Y_{BL}(x, y)$ the luminance of LDR input (114-Y), then, in an example embodiment, the output $D^L$ (220) of Stage 1 (200B-1) may be computed as follows:

If $(Y_{BL}(x,y) \geq thr))$ $$d_f^L(x,y) = d_f^{L,N}(x,y)$$

else $$d_f^L(x,y) = d_f^{L,W}(x,y), \quad (5)$$

where thr is a predetermined threshold (e.g., $thr = 2^{B_{EDR}-1}$).

In some embodiments, instead of selecting between the $d_f^{L,W}$ and $d_f^{L,N}$ values, one may apply a linear or non-linear blend of the two values. In an embodiment, in equation (5), instead of a comparing a single pixel to the threshold thr, one may compare a function of neighbor pixels to the threshold (e.g., the average, median, standard deviation, and the like, of a region of pictures surrounding the $Y_{BL}(x, y)$ pixel). As would be appreciated by people skilled in the art, the method can also be extended to use more than two OTF filters, or low-pass or high-pass filters that may not be based on the OTF.

Figure 4:
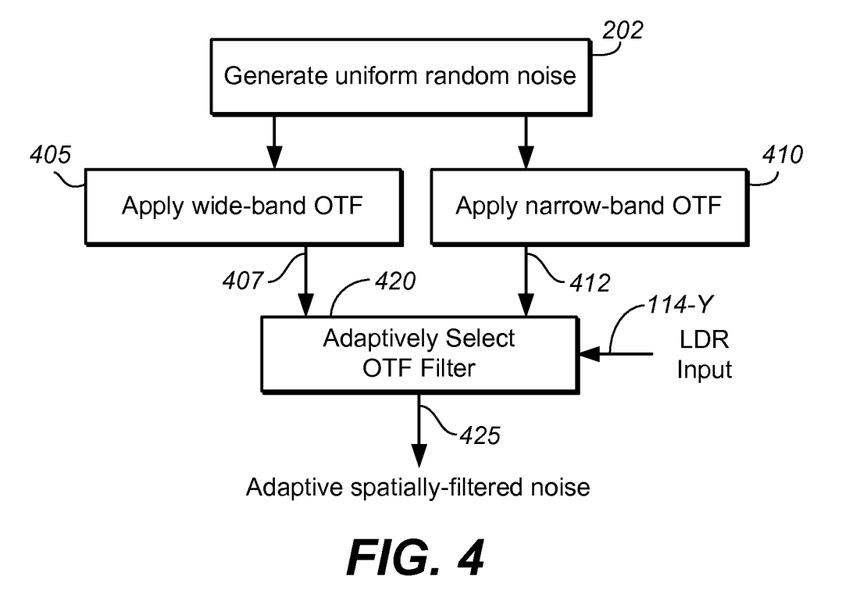
FIG. 4 depicts an example process for adaptively selecting OTF-based filters during the noise dithering generation process according to an embodiment of the present invention.

A similar adaptive OTF filtering method may also be applied for generating the high-pass spatial noise (206) in step (200A-1) of process (200A). FIG. 4 depicts an example processing flow for adaptively selecting the pass-bands of the low-pass or high-pass, spatially-filtered noise according to an embodiment. Given uniformly distributed noise (202), in step (405), two or more OTF-based filters are applied to generate OTF-filtered noise (407) and (412). As described earlier, depending on the target bit rate, each of these noise signal may represent a low-pass-filtered (e.g., 220) or a high-pass-filtered (e.g., 206) output of the input noise (202). Finally, given the characteristics of the LDR input (114-Y) (e.g., the luminance pixel values), a final output spatially-filtered noise signal (425) is generated based on the two or more filtered signals (407 and 412).

Because of the ring buffer (210), and the temporal filtering (212) in Stage 2 (320) of the dithering process (300), noise images (220) and (206) generated for a frame f may affect the noise images generated for future frames as well. Hence, in an embodiment, the decision on which OTF filter to apply for noise generated for frame f may also depend on luminance values at corresponding pixel values in future frames, say f+1, f+2, and f+3.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to pre-dithering of images with enhanced dynamic range, such as those described herein. The computer and/or IC may compute any of a variety of parameters or values that relate to pre-dithering processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to pre-dithering EDR images as described above by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to the efficient pre-dithering of EDR images are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method for pre-dithering images to be coded by an encoder, the method comprising:
   receiving an input low dynamic range (LDR) image in a first bit depth to be encoded by the encoder at a target bit rate;
   generating a random noise image;
   filtering the random noise image with a spatial filter to generate a spatial-filtered noise image;
   storing the spatial-filtered noise image in a ring buffer;
   repeating the generation of the spatial-filtered noise images and storing the same in the ring buffer;
   applying a temporal filter to images in the ring buffer to generate a temporal-filtered noise image;
   adding the temporal-filtered noise image to the input LDR image to generate a noise-enhanced LDR image; and
   quantizing the noise-enhanced image to a second bit-depth to generate an output dithered LDR image, wherein the second bit-depth is lower than the first bit depth.

2. The method of claim 1, wherein generating the random noise image comprises:
   generating uniformly-distributed random noise values between 0 and 1;
   multiplying the generated noise values by a constant to generate scaled noise values; and
   forming the random noise image using the scaled noise values.

3. The method of claim 2 wherein the multiplying constant is determined based on the difference between the first bit depth and the second bit depth.

4. The method of claim 1, wherein the spatial filter is either a low-pass filter or a high-pass filter.

5. The method of claim 1, wherein the spatial filter is based on the optical transfer function (OTF) of the human visual system.

6. The method of claim 1, wherein generating the spatial-filtered noise image comprises:
   filtering the random noise image with an OTF-based low pass filter to generate a low-pass filtered noise image; and
   subtracting the low-pass filtered noise image from the random noise image to generate a high-pass spatial-filtered noise image.

7. The method of claim 1, wherein storing the spatial-filtered noise image in the ring buffer further comprises:
   shifting the images in the ring buffer by one position; and
   storing the spatial-filtered noise image in an end position of the ring buffer.

8. The method of claim 1, wherein the temporal filter is a low-pass filter or a high-pass filter.

9. The method of claim 1, wherein generating the temporal-filtered noise image comprises:
   filtering the images in the ring buffer with a temporal low pass filter to generate a low-pass temporal-filtered noise image; and
   subtracting the low-pass temporal-filtered noise image from one of the stored images in the ring buffer to generate a high-pass temporal-filtered noise image.

10. The method of claim 1, further comprising:
    determining whether the target bit rate is a low bit rate or a high bit rate; and
    for the spatial and temporal filtering steps:
    if the target bit rate is determined to be a low bit rate, selecting a low-pass spatial filter and a low-pass temporal filter, otherwise selecting a high-pass spatial filter and a high-pass temporal filter.

11. The method of claim 1, wherein before adding the temporal-filtered noise image to the input LDR image, the temporal-filtered noise is scaled by a scaled factor.

12. The method of claim 1, further comprising:
    comparing each luminance pixel value of the input LDR image with a threshold; and, for the spatial filtering step:
    selecting a first spatial filter if the luminance pixel value is equal or higher to the threshold and selecting a second spatial filter if the luminance pixel value is lower than the threshold.

13. The method of claim 1, further comprising:
    generating a region-based luminance pixel value for a pixel region of the input LDR image as a function of luminance pixel values of the pixels of the pixel region;
    comparing the region-based luminance pixel with a threshold; and, for the spatial filtering step:
    selecting a first spatial filter if the region-based luminance pixel value is equal or higher to the threshold and selecting a second spatial filter if the region-based luminance pixel value is lower than the threshold.

14. The method of claim 12, wherein the first and the second spatial filters are OTF-based filters.

15. The method of claim 12, wherein the first spatial filter has a narrower pass-band than the second spatial filter.

16. The method of claim 1, further comprising encoding the output dithered image at the target bit rate.

17. The method of claim 1, wherein the input LDR was generated based on an EDR image and the EDR image and the output dithered LDR are encoded together.

18. A non-transitory computer-readable storage medium having stored thereon computer-executable instructions for executing a method with a computer in accordance with claim 1.

* * * * *